United States Patent
Itagaki et al.

(10) Patent No.: US 10,839,271 B2
(45) Date of Patent: Nov. 17, 2020

(54) IMAGE PROCESSING APPARATUS, METHOD AND STORAGE MEDIUM

(71) Applicant: CANON KABUSHIKI KAISHA, Tokyo (JP)

(72) Inventors: Tomohisa Itagaki, Abiko (JP); Takaaki Yano, Tokyo (JP); Aya Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/434,716

(22) Filed: Jun. 7, 2019

(65) Prior Publication Data

US 2019/0385029 A1    Dec. 19, 2019

(30) Foreign Application Priority Data

Jun. 15, 2018  (JP) ................. 2018-114905

(51) Int. Cl.
*G06K 15/02*  (2006.01)

(52) U.S. Cl.
CPC ....... *G06K 15/021* (2013.01); *G06K 15/1822* (2013.01); *G06K 15/1878* (2013.01)

(58) Field of Classification Search
None
See application file for complete search history.

(56) References Cited

U.S. PATENT DOCUMENTS

| | | | |
|---|---|---|---|
| 5,926,202 A | 7/1999 | Hattori | |
| 6,061,153 A * | 5/2000 | Sugita | H04N 1/6011 358/518 |
| 6,466,334 B1 * | 10/2002 | Komiya | H04N 1/603 358/1.9 |
| 6,567,543 B1 * | 5/2003 | Shiraiwa | H04N 1/6088 348/E9.052 |
| 7,324,243 B2 | 1/2008 | Cheng | |
| 7,857,114 B2 | 12/2010 | Hamasaki | |
| 8,280,155 B2 * | 10/2012 | Ten | G06T 11/001 382/162 |
| 2004/0071349 A1 * | 4/2004 | Harrington | H04N 13/161 382/232 |
| 2005/0012948 A1 * | 1/2005 | Gotoh | H04N 1/6086 358/1.9 |
| 2005/0068330 A1 * | 3/2005 | Speigle | H04N 1/6086 345/589 |
| 2005/0111693 A1 * | 5/2005 | Loce | H04N 1/387 382/100 |

(Continued)

FOREIGN PATENT DOCUMENTS

JP    2002-292909 A    10/2002

*Primary Examiner* — Anh-Vinh T Nguyen
(74) *Attorney, Agent, or Firm* — Canon U.S.A., Inc. IP Division

(57) ABSTRACT

A chromaticity value, which is a measurement result for a sheet to be measured, is acquired by using a sensor in which a light source has fixed characteristics, a condition under which the measurement result is acquired by the sensor is designated, an optical brightening agent amount contained in the sheet is determined by using a spectral reflectance obtained by performing measurement on the sheet with use of the sensor, and the acquired chromaticity value is converted by using the designated condition and information about the determined optical brightening agent amount.

11 Claims, 15 Drawing Sheets

(56) References Cited

U.S. PATENT DOCUMENTS

| | | | |
|---|---|---|---|
| 2005/0206928 A1* | 9/2005 | Itagaki | H04N 1/40006 |
| | | | 358/1.9 |
| 2006/0098219 A1* | 5/2006 | Kajihara | H04N 1/6025 |
| | | | 358/1.9 |
| 2009/0010537 A1* | 1/2009 | Horie | G09G 5/02 |
| | | | 382/167 |
| 2009/0190193 A1* | 7/2009 | Sato | H04N 1/56 |
| | | | 358/505 |
| 2010/0103455 A1* | 4/2010 | Morikawa | H04N 1/486 |
| | | | 358/1.15 |
| 2011/0052057 A1 | 3/2011 | Aihara | |
| 2012/0008858 A1* | 1/2012 | Sedky | G06T 7/194 |
| | | | 382/155 |
| 2012/0183213 A1* | 7/2012 | Robles-Kelly | G06K 9/00362 |
| | | | 382/165 |
| 2013/0093916 A1* | 4/2013 | Bai | H04N 1/6086 |
| | | | 348/223.1 |
| 2014/0132827 A1* | 5/2014 | Imai | H05B 47/10 |
| | | | 348/370 |
| 2014/0272339 A1 | 9/2014 | Tyagi et al. | |
| 2017/0048423 A1 | 2/2017 | Itagaki | |
| 2018/0234593 A1* | 8/2018 | Itagaki | G03G 15/55 |
| 2019/0387133 A1* | 12/2019 | Ito | H04N 1/38 |

\* cited by examiner

FIG. 9

| REGISTRATION OF SHEET INFORMATION | | | |
|---|---|---|---|
| SHEET INFORMATION | | | |
| NAME | USER SHEET A | CHANGE ▷ | UI902 |
| GRAMMAGE | 120 gsm | CHANGE ▷ | UI903 |
| SIZE | A3 | CHANGE ▷ | UI904 |
| SURFACE PROPERTY | FINE QUALITY PAPER | CHANGE ▷ | UI905 |
| OPTICAL BRIGHTENING AGENT AMOUNT | SMALL | CHANGE ▷ | UI906 |

UI901

UI907 CANCEL

UI908 REGISTER

FIG. 10
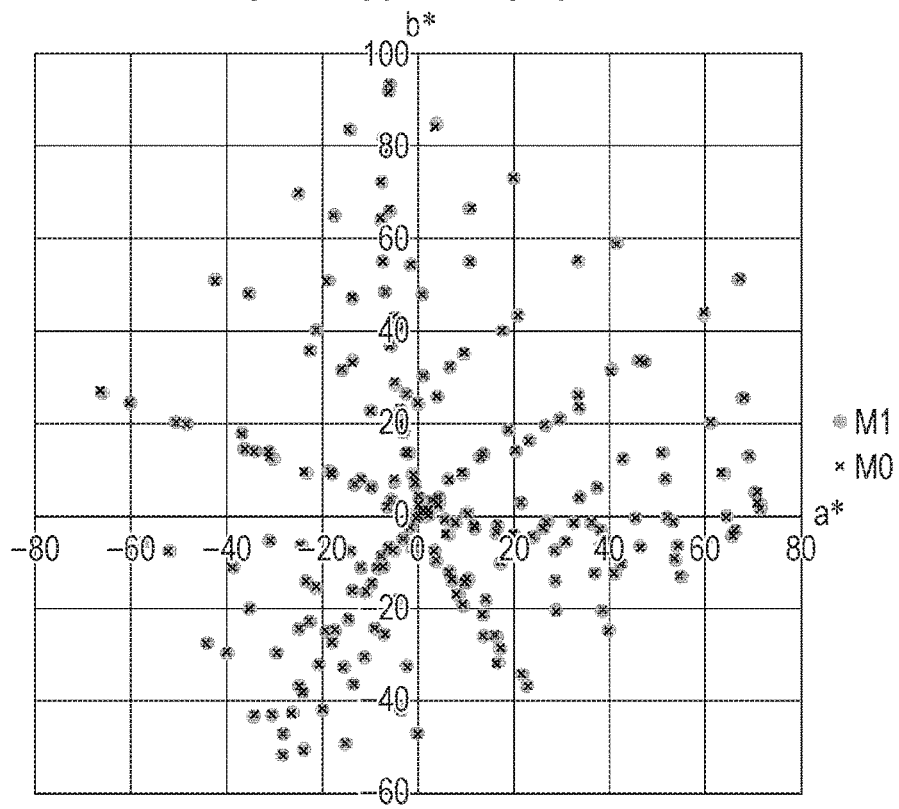
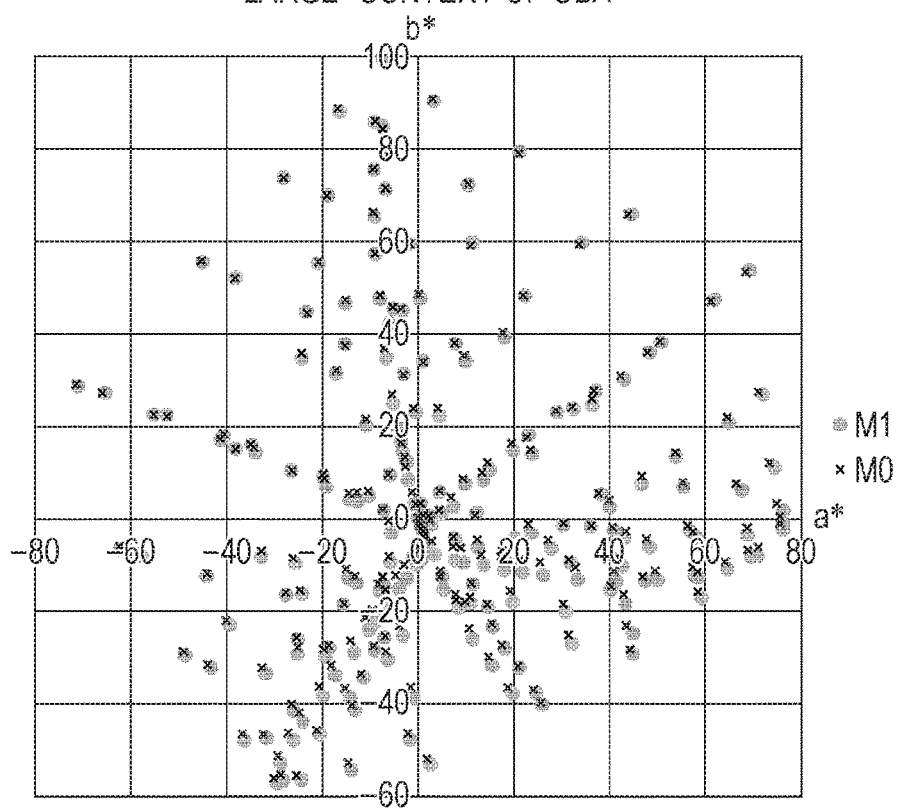

IMAGE PROCESSING APPARATUS, METHOD AND STORAGE MEDIUM

BACKGROUND

Field of the Disclosure

The present disclosure generally relates to image processing and, more particularly, to an image processing apparatus, an image processing method and a storage medium capable of acquiring a chromaticity value according to a desired measurement condition even when a color measurement device in which a light source has fixed characteristics is used.

Description of the Related Art

A printing apparatus of the related art is equipped with various color management techniques. Examples thereof include calibration of correcting a color tone of an image output by the printing apparatus, a technique of creating a profile so that a desired color is output in an output image, and a technique (verification) of determining whether a color of an image output by the printing apparatus meets a criterion.

In recent years, an optical brightening agent (OBA) has been used for many types of sheets. The OBA is used to enhance luminance of a sheet and improve visual quality of a printed material. The OBA acts in accordance with a principle of fluorescence, and thus absorbs radiation of ultraviolet ray (UV) whose wavelength is 400 nanometers (nm) or less and emits light mainly with a region of a blue visible spectrum of 400 to 450 nm. Accordingly, when a sheet that contains the OBA is irradiated with light that includes the UV, not only reflected light but also radiation light by fluorescence is added, and the sheet appears pale. As a result, a difference is caused between a colorimetric value and actual appearance.

To solve such a difference between a colorimetric value and actual appearance in a sheet that contains the OBA, Japanese Patent Laid-Open No. 2002-292909 describes a technique of faithfully outputting a color of original image data without being affected by radiation light of the OBA.

SUMMARY

According to one or more aspects of the present disclosure, an image processing apparatus includes: an acquisition unit configured to acquire a chromaticity value, which is a measurement result for a sheet to be measured, by using a sensor in which a light source has fixed characteristics; a designation unit configured to designate a condition under which the measurement result is acquired by the sensor; a determination unit configured to determine an optical brightening agent amount contained in the sheet by using a spectral reflectance obtained by performing measurement on the sheet with use of the sensor; and a chromaticity value conversion unit configured to convert the chromaticity value, which is acquired by the acquisition unit, by using the condition designated by the designation unit and information about the optical brightening agent amount determined by the determination unit.

Further features of the present disclosure will become apparent from the following description of exemplary embodiments with reference to the attached drawings.

BRIEF DESCRIPTION OF THE DRAWINGS

FIG. 9 illustrates an example of a UI screen for performing registration of sheet information.

FIG. 10 is a chromaticity distribution view for explaining a relationship between a content of an OBA and a measurement condition.

DESCRIPTION OF THE EMBODIMENTS

Figure 1:
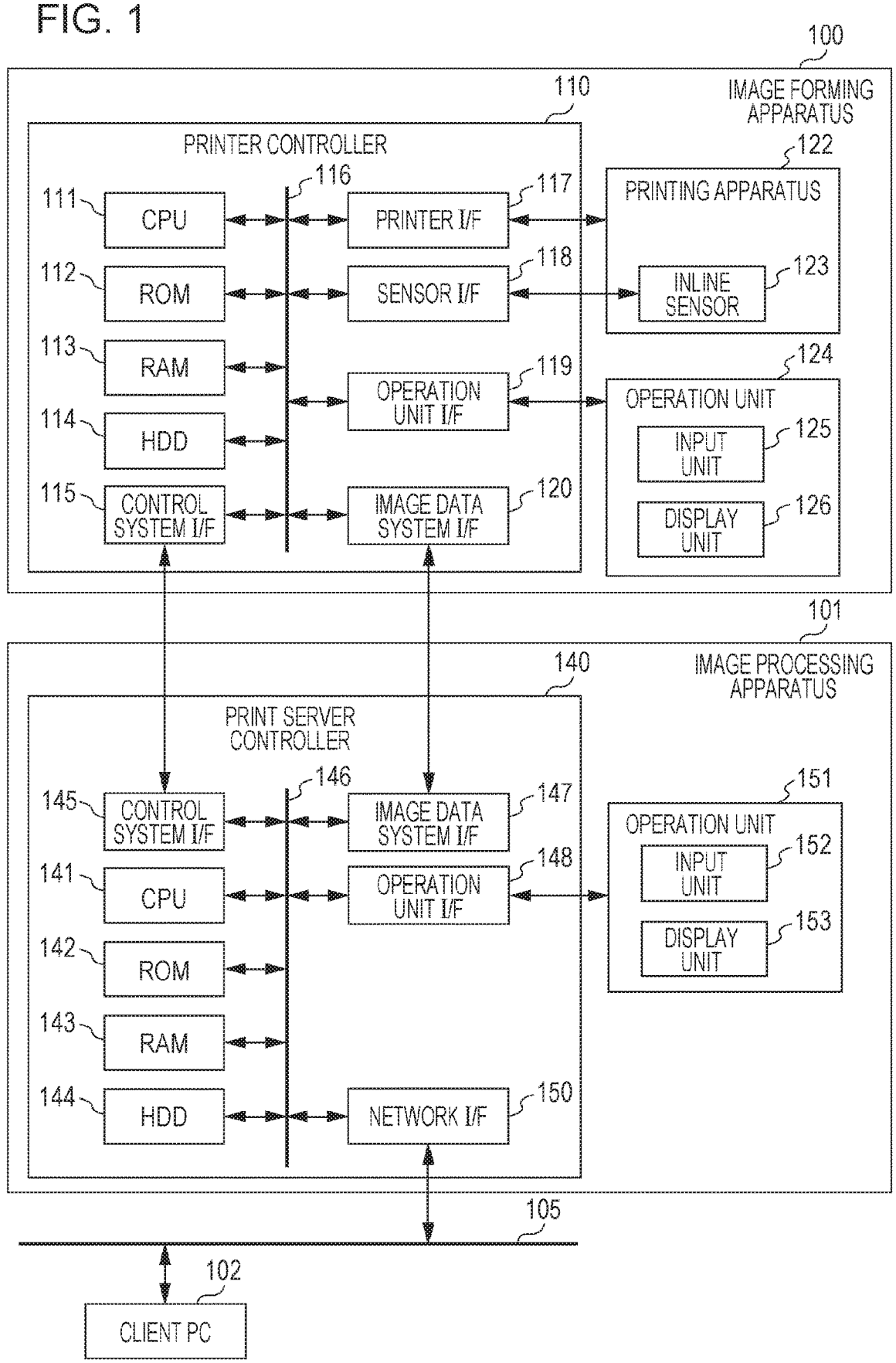
FIG. 1 illustrates a hardware configuration of an image processing apparatus.

Various exemplary embodiments, features, and aspects of the present disclosure will be described in detail below with reference to the accompanying drawings, but the present disclosure is not limited to the following exemplary embodiments.

As new standard illuminant conditions (measurement illuminant conditions) of a colorimeter in consideration of ultraviolet light, "M" of ISO 12655-2009 is defined by the ISO.

In the ISO 12655-2009, measurement illuminant conditions of "M0" in which ultraviolet light is not considered and "M1" in which ultraviolet light is considered are defined.

When the measurement illuminant condition is M0, a colorimetric value obtained by performing, under the condition, color measurement for an image that is formed by using a sheet which does not contain an OBA and a coloring material such as toner has a correlation with visual perception of human eyes. However, a colorimetric value obtained by performing, under the condition, color measurement for an image that is formed on a sheet which uses the OBA and contains a fluorescent component which may be affected by ultraviolet light does not have an appropriate correlation with visual perception of human eyes.

Meanwhile, when the measurement illuminant condition is M1, an element of ultraviolet light is also considered in a result of color measurement. Thus, both a colorimetric value of an image that is formed by using a sheet which does not use the OBA and a coloring material such as toner and a colorimetric value of an image that is formed by using a sheet which uses the OBA and a coloring material such as toner, which are obtained by performing color measurement under the condition, have an appropriate correlation with visual perception of human eyes.

Therefore, in recent years, the measurement illuminant condition M1 has been increasingly used.

FIG. 10 is a view for explaining that a measurement value varies due to a variation in a content of the OBA when a measurement illuminant condition is changed.

By using a spectral color measurement device i1Pro2 in which a light source is able to be changed and which is manufactured by X-Rite Inc., chromaticity values of L*a*b* of color patches printed on a sheet with a small content of the OBA and a sheet with a large content of the OBA are obtained by color measurement under the measurement illuminant conditions M0 and M1.

FIG. 10 illustrates chromaticity distribution in which results of the color measurement are plotted in an a*b* plane.

Compared to the sheet with the small content of the OBA, the sheet with the large content of the OBA causes a great difference between a result of the color measurement under the measurement illuminant condition M0 and a result of the color measurement under the measurement illuminant condition M1.

As a result of performing measurement on, for example, a blank part in the sheet with the large content of the OBA, a measurement error of a color difference of about $\Delta E=2.5$ is caused in some cases.

As the color difference in colorimetric values, $\Delta E=2.5$ is a very large numeric value, and there is a problem in color management, such as a color change in an output material due to lowering of accuracy of profile creation or incompatibility to accuracy of color verification.

In recent years, there has been an image forming apparatus with a configuration in which a spectral color measurement device (hereinafter, inline sensor) is incorporated in the apparatus to perform printing of a color patch and color measurement at the same time.

Strict limitations on a unit size and a price are used for the inline sensor. Thus, the inline sensor often has a simple configuration, for example, in which only one kind of light source is provided and the measurement illuminant condition under which measurement is allowed is fixed (characteristics of the light source are fixed).

In a case where a color measurement device in which the measurement illuminant condition is fixed to M0 is used, however, when the measurement illuminant condition is designated as M1 and a sheet containing the OBA is subjected to color measurement, there is no correlation between a colorimetric value and appearance as described above, so that appropriate color management may not be performed. Moreover, in a case where an amount of the OBA contained in a sheet to be used is not known, an appropriate colorimetric value is not able to be obtained. However, differently from a grammage or a surface property (fine quality paper, coated paper, or the like), the OBA amount is generally not described in a package of a printing sheet in many cases when the printing sheet is purchased. Thus, it is difficult for a general user to know the OBA amount. Further, in a case where the OBA amount is not published by a supplier or a case where a sheet whose content of the OBA is not able to be determined by appearance is used, the OBA amount is not able to be known.

The present embodiment is made in view of the aforementioned problems and the content of the OBA of a sheet is automatically determined even when the content is not known.

According to the embodiment, even when a sheet to be used is a sheet containing the OBA, an appropriate colorimetric value is able to be acquired.

Hereinafter, various exemplary embodiments, features, and aspects of the disclosure will be described with reference to the drawings.

Exemplary Embodiment 1

[Hardware Configuration of Image Processing Apparatus]

FIG. 1 is a block diagram illustrating a hardware configuration of an image processing apparatus according to the present exemplary embodiment.

In an image forming apparatus 100, a printer controller 110 is a printer controller of the image forming apparatus 100. A central processing unit (CPU) 111, which may include one or more processors, one or more memories, circuitry, or a combination thereof, may comprehensively control access to various kinds of devices, which are connected to a system bus 116, on the basis of a control program stored in a read-only-memory (ROM) 112 or a hard disk (HDD) 114. The ROM 112 stores a control program and the like that are able to be executed by the CPU 111. A random access memory (RAM) 113 mainly functions as a main memory, a work area, and the like of the CPU 111 and is configured to have a memory capacity that is able to be expanded by using an optional RAM connected to an expansion port (not illustrated). The hard disk (HDD) 114 stores a boot program, various kinds of applications, font data, a user file, an edit file, and the like. Note that, though the HDD 114 is used in the present exemplary embodiment, a secure digital (SD) card, a flash memory, or the like may be used as an external storage device, in addition to the HDD 114. A control system interface (I/F) 115 receives information needed for print control from an image processing apparatus 101. A printer I/F 117 controls image output to a printing apparatus 122. An operation unit I/F 119 performs display control of a display unit 126 provided in an operation unit 124 and control of input of various kinds of setting information set by an input unit 125. An image data system I/F 120 receives, from the image processing apparatus 101, image data to be transmitted to the printing apparatus 122.

A sensor I/F 118 transmits an operation instruction of an inline sensor 123 provided in the printing apparatus 122 and receives a measurement result of the inline sensor 123. The inline sensor 123 will be described below.

In the image processing apparatus 101, a print server controller 140 performs processing, such as analysis of a print job that is input or development processing to image data, to execute print processing in the image processing apparatus 101. A CPU 141 comprehensively controls access to various kinds of devices, which are connected to a system bus 146, on the basis of a control program stored in a ROM 142 or a hard disk (HDD) 144. The ROM 142 stores a control program and the like that are able to be executed by the CPU 141. A RAM 143 mainly functions as a main memory, a work area, and the like of the CPU 141 and is configured to have a memory capacity that is able to be expanded by using an optional RAM connected to an expansion port (not illustrated). The HDD 144 stores a boot program, various kinds of applications, font data, a user file, an edit file, and the like. Note that, though the HDD 144 is used in the present exemplary embodiment, an SD card, a flash memory, or the like may be used as an external storage device, in addition to the HDD 144.

A control system I/F 145 transmits information needed for print control to the image forming apparatus 100.

An image data system I/F 147 transmits, to the image forming apparatus 100, image data to be output by the printing apparatus 122.

An operation unit I/F 148 performs display control of a display unit 153 provided in an operation unit 151 and control of input of various kinds of setting information set by an input unit 152. Here, though the image forming apparatus 100 and the image processing apparatus 101 are respectively configured to have independent operation units 124 and 151, both operation units may be configured to use common hardware.

A network I/F 150 performs data communication with an external network 105 via a network cable.

A client personal computer (PC) 102 is connected to the image processing apparatus 101 through the external network 105. The client PC 102 inputs a print job to the image processing apparatus 101.

[Hardware Configuration of Inline Sensor]

Figure 2:
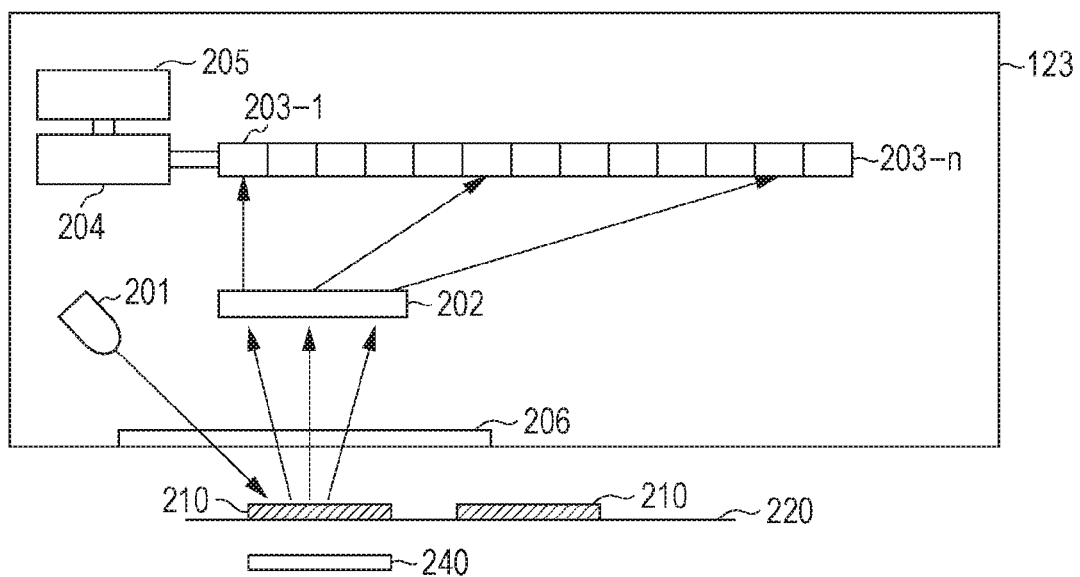
FIG. 2 illustrates a hardware configuration of an inline sensor.

FIG. 2 illustrates a hardware configuration of the inline sensor 123 provided in the printing apparatus 122 and the inline sensor 123 is commonly called also an ILS. The inline sensor 123 is installed in a sheet conveyance path of the printing apparatus 122 and installed in a part from a fixing unit (not illustrated) to a sheet output port (not illustrated) in the sheet conveyance path.

The inline sensor 123 includes a white light emitting diode (LED) 201, a diffraction grating 202, a line sensor 203 (203-1 to 203-n (n is any number)), a calculation unit 204, and a memory 205. The white LED 201 radiates light to a measurement image 210 on a sheet 220.

The diffraction grating 202 spectrally disperses reflected light from the measurement image 210 for each wavelength. The line sensor 203 includes n light receiving elements (n pixels). The calculation unit 204 performs various kinds of calculation on the basis of a light intensity value of each of the pixels of the line sensor 203. The memory 205 saves various kinds of data.

The inline sensor 123 detects light intensity of reflected light for wavelengths ranging from 380 [nm] to 720 [nm] at intervals of 10 [nm]. In this case, n is 34. The calculation unit 204 includes, for example, a spectral calculation unit that calculates a spectral reflectance on the basis of the light intensity value of each of the pixels of the line sensor 203, a L*a*b* calculation unit that calculates L*a*b* values, and the like. The inline sensor 123 may include a lens 206 that condenses light, which is emitted from the white LED 201, onto the measurement image 210 on the sheet 220 or condenses reflected light from the measurement image 210 onto the diffraction grating 202.

The inline sensor 123 has a white reference plate 240 mainly made from alumina (aluminum oxide). The inline sensor 123 executes adjustment of a light volume of the white LED 201 by using the white reference plate 240. For example, the inline sensor 123 emits light from the white LED 201 in a state where the sheet 220 has not passed through a measurement position of the inline sensor 123, and receives reflected light from the white reference plate 240 with the line sensor 203. The calculation unit 204 adjusts light emission intensity of the white LED 201 so that a light intensity value of a predetermined pixel of the line sensor 203 becomes a predetermined value.

Figure 3:
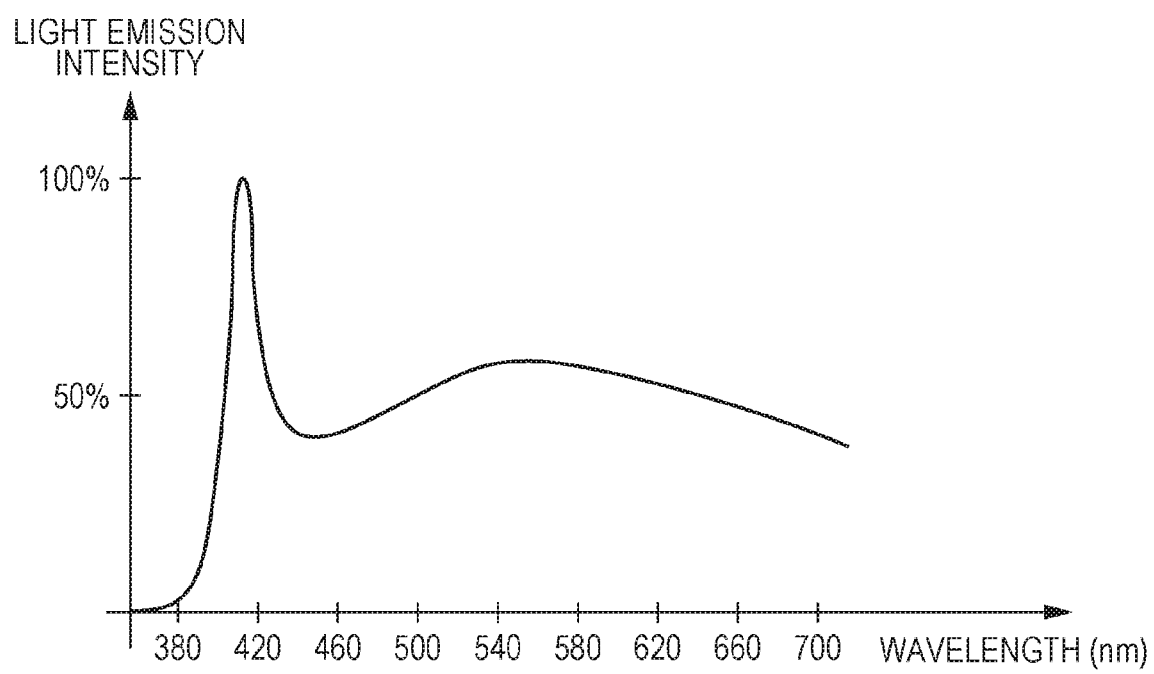
FIG. 3 illustrates distribution of light emission intensity of a white LED.

FIG. 3 illustrates distribution of the light emission intensity of the white LED 201. A horizontal axis indicates a wavelength of light emitted from the white LED 201 and a vertical axis indicates the light emission intensity.

It is characterized that the white LED 201 is a light source that emits a light of a short wavelength of 400 nm or less, which is easily affected by an optical brightening agent contained in a sheet.

The inline sensor 123 has a light source that has fixed characteristics (wavelength), which may be said as being equivalent to a case where the measurement illuminant condition is M0.

Figure 4:
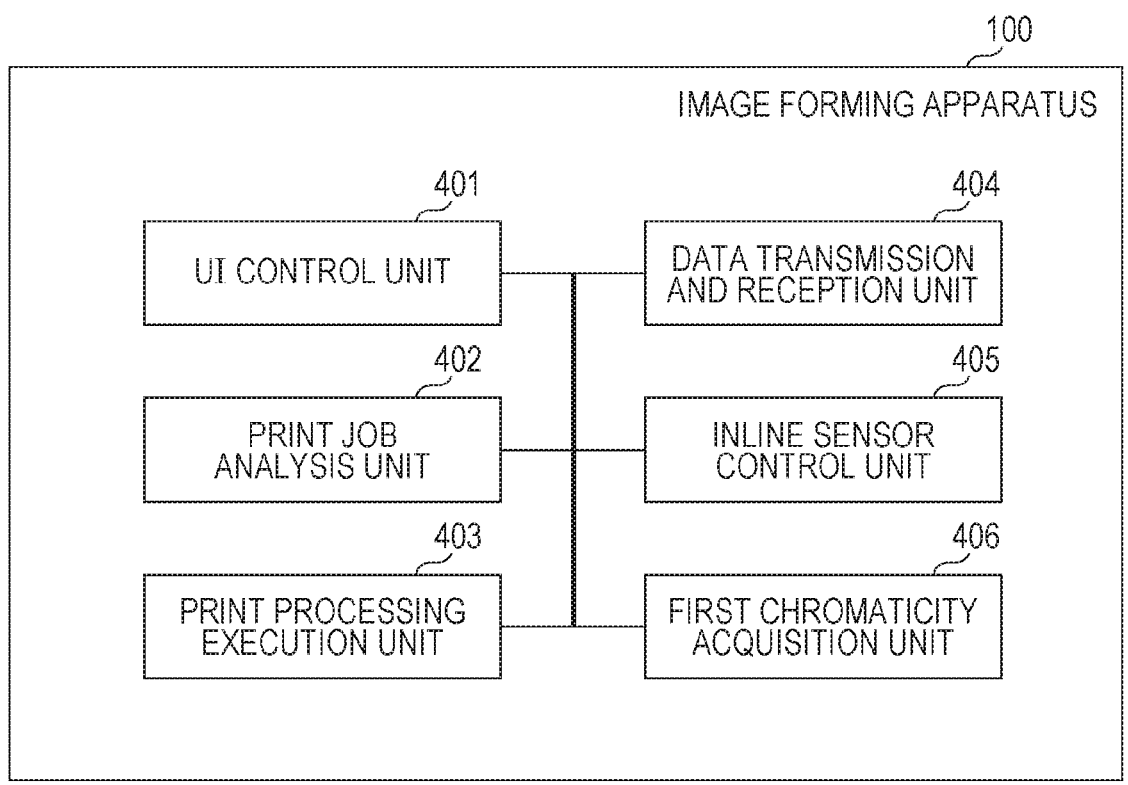
FIG. 4 illustrates a software configuration of an image forming apparatus.

[Software configuration of image forming apparatus] FIG. 4 is a block diagram related to a software module configuration of the image forming apparatus 100 according to the present exemplary embodiment. Software modules thereof are stored as programs in the HDD 114 and read out into the RAM 113 by the CPU 111 for execution.

A user interface (UI) control unit 401 performs, through the operation unit I/F 119, display control of the display unit 126 in the operation unit 124 and control of input of various kinds of setting information set by the input unit 125.

A print job analysis unit 402 analyzes data of a print job received from the image processing apparatus 101.

A print processing execution unit 403 controls a series of print operations, such as sheet feeding, sheet conveyance, printing, and sheet discharging, which are executed in the printing apparatus 122, for the analyzed print job.

A data transmission and reception unit 404 controls data transmission and reception to and from the image processing apparatus 101. Examples of the data to be transmitted and received include data of a print job, chromaticity data acquired through measurement of the inline sensor 123, and the like.

An inline sensor control unit 405 controls a measurement operation of the inline sensor 123 provided in the image forming apparatus 100. By controlling the inline sensor 123 at a timing programmed in advance, spectral information of a predetermined color patch printed on a sheet is acquired.

A first chromaticity acquisition unit 406 acquires a predetermined chromaticity value from the spectral information acquired by the inline sensor control unit 405 with the inline sensor 123. The chromaticity value indicates, for example, L*a*b*.

As described above, an inline sensor in which characteristics of a light source is fixed is able to acquire only spectral information by one kind of light source. Thus, a chromaticity value acquired from the acquired spectral information by the one kind of light source also has one kind. In the present exemplary embodiment, the inline sensor 123 in which the white LED 201 serves as the light source is used. Thus, a first chromaticity value is treated as a value acquired under a condition corresponding to the measurement illuminant condition M0.

[Software Configuration of Image Processing Apparatus]

Figure 5:
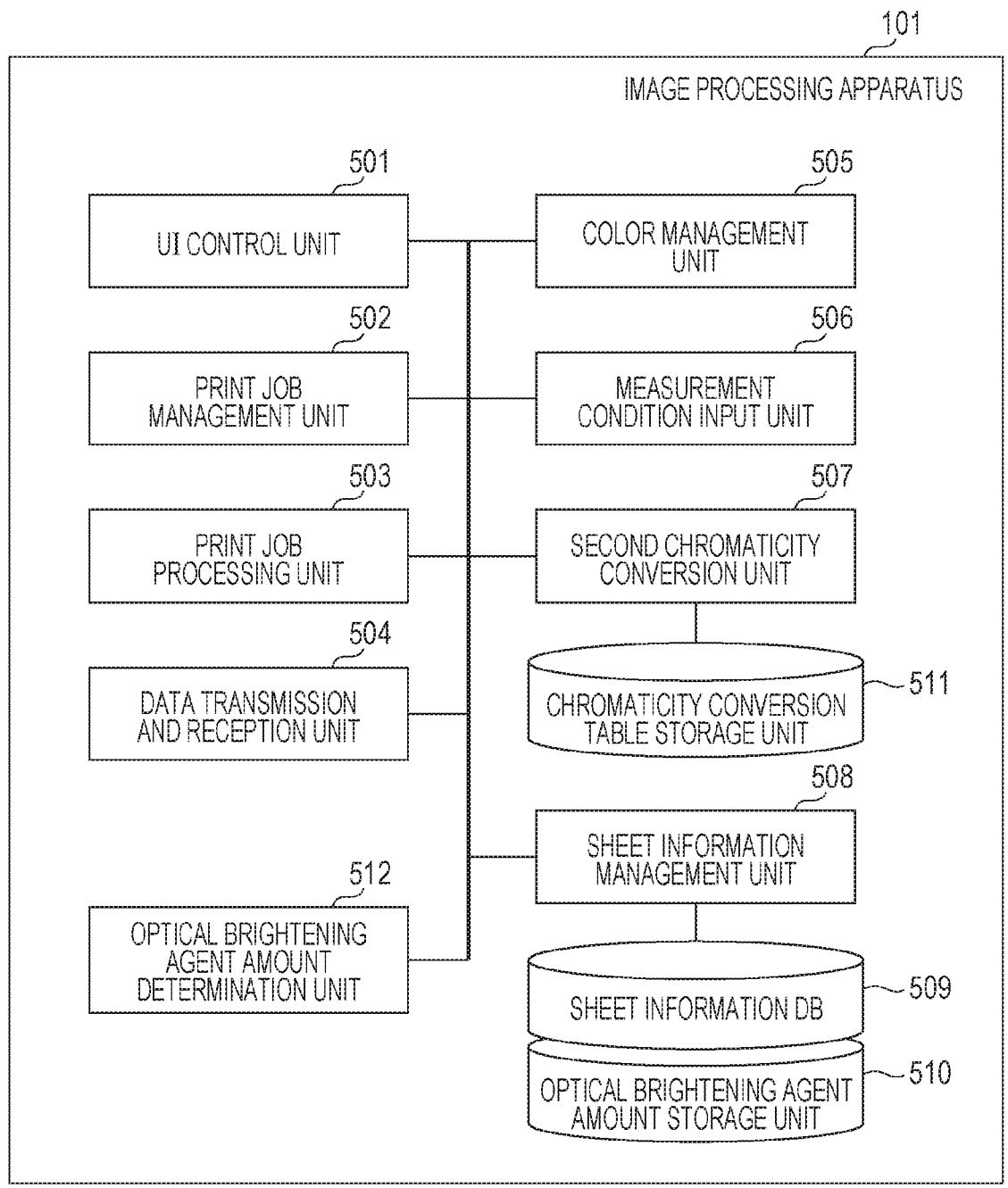
FIG. 5 illustrates a software configuration of the image processing apparatus.

FIG. 5 is a block diagram related to a software module configuration of the image processing apparatus 101 according to the present embodiment. Software modules thereof are stored as programs in the HDD 144 and read out into the RAM 143 by the CPU 141 for execution.

A UI control unit 501 performs, through the operation unit I/F 148, display control of the display unit 153 in the operation unit 151 and control of input of various kinds of setting information set by the input unit 152.

A print job management unit 502 manages print job data received from a user. Specifically, the print job management unit 502 performs processing such as calling of a print job saved in the HDD 144, reflection of a change of print job setting, or management of a history of a job already printed.

A print job processing unit 503 performs processing needed for execution of print processing, such as analysis of a print job received from the user, development to image data, or image compression and decompression.

A data transmission and reception unit 504 manages transmission and reception of various kinds of data to and from the image forming apparatus 100. The data transmission and reception unit 504 transmits print job data generated by the print job processing unit 503 to the image forming apparatus 100. Further, the data transmission and reception unit 504 manages transmission and reception of data to and from the client PC 102 connected through the network I/F 150 via an external network.

A color management unit 505 controls and executes various kinds of color management processing to keep and manage image quality related to color impression in the image processing apparatus 101. The color management processing refers to, for example, color check processing that enables to know a state of the color of an image that is currently output from the image forming apparatus 100, calibration processing executed to improve the color to have an appropriate state, color profile creation processing, or the like. All of the processing may involve acquiring a chromaticity value of a predetermined color patch that is formed and printed on a sheet. A difference between the acquired chromaticity value and a target chromaticity value is acquired, calibration data is updated so that the acquired chromaticity value becomes close to the target chromaticity value, or creation of a color profile is executed.

A measurement condition input unit 506 receives a setting of a measurement illuminant condition for measuring a color of an image, which is requested by the color management unit 505. The measurement illuminant condition mentioned here indicates a setting value of M (hereinafter, an M factor) which is a measurement illuminant condition of a color measurement device defined by the ISO 12655-209 described above.

A second chromaticity conversion unit 507 performs processing of converting a chromaticity value, which is a chromaticity value received from the image forming apparatus 100 and obtained through color measurement by the inline sensor 123, into a second chromaticity value so as to satisfy the aforementioned measurement condition. Conversion table information used to convert the chromaticity value is stored in a chromaticity conversion table storage unit 511. A processing procedure of the conversion unit will be described in detail below.

A sheet information management unit 508 manages sheet information used in the image processing apparatus 101. The sheet information is stored in a sheet information database (DB) 509 as a set of parameters indicating characteristics of a sheet, such as a sheet name, a size, a grammage, and a surface property. Here, a certain number of pieces of sheet information are generally stored in advance by a supplier that manufactures and sells an image processing system and the user is able to read and use the information as desired.

Moreover, a parameter that is a feature of the present embodiment and indicates an optical brightening agent amount of a sheet is also stored in an optical brightening agent amount storage unit 510 as a part of the sheet information DB 509. In the present embodiment, it is assumed that the parameter indicating the optical brightening agent amount of the sheet is constituted by three elements of "no", "small", and "large" and one of them is stored in association with the sheet information. However, the number of types of the parameter of the optical brightening agent amount is not limited to three, and may be two of, for example, "without" and "with" or the parameter may be constituted by four or more types of elements that are further classified.

Note that, the parameter indicating the optical brightening agent amount in the present embodiment is stored in advance by the supplier in the optical brightening agent amount storage unit 510 as a part of the parameters of the sheet information on the basis of information about the optical brightening agent amount published by a manufacturer that manufactures and sells a sheet.

The optical brightening agent amount storage unit 510 is also able to receive input of the OBA amount by the user through the UI control unit 501.

Further, an optical brightening agent amount determination unit 512 automatically determines the OBA amount by the ILS 123.

[Flowchart Related to Processing Executed in Image Forming Apparatus]

Figure 6:
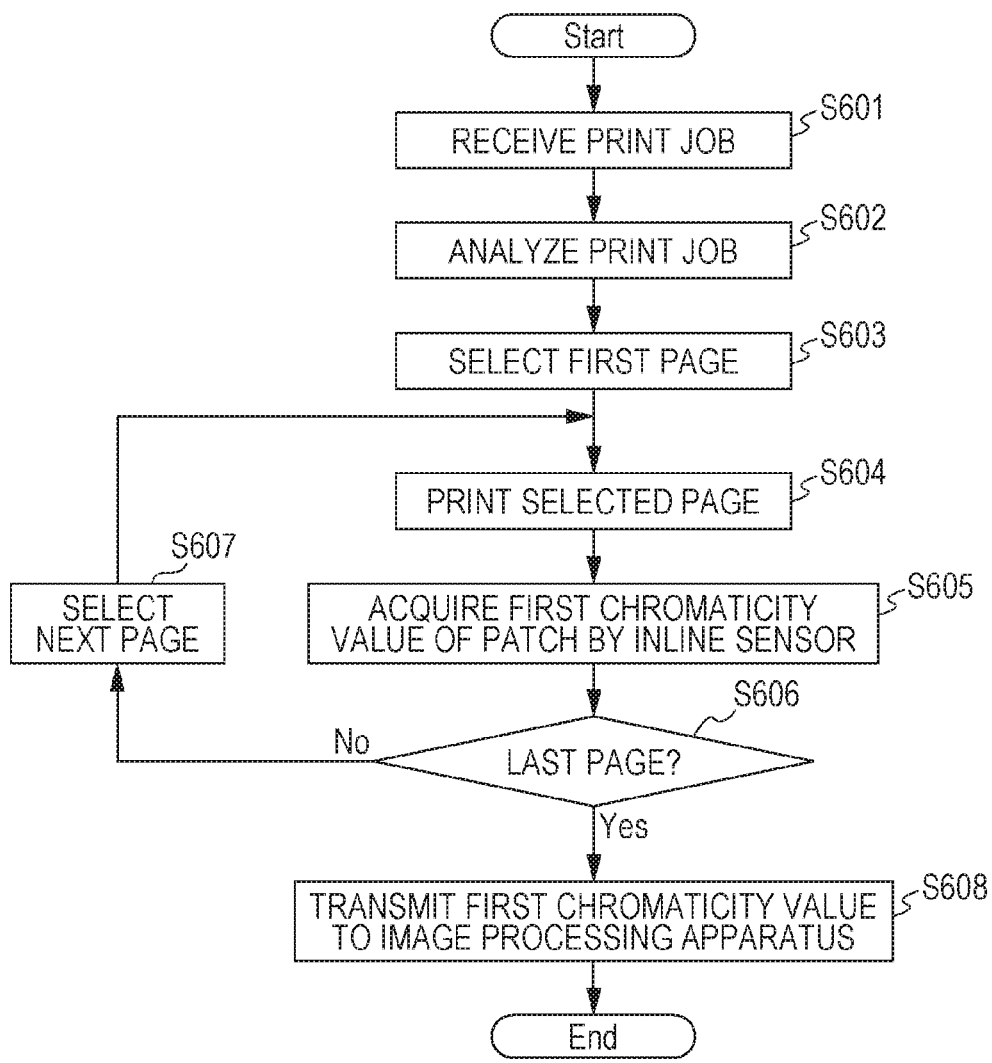
FIG. 6 is a flowchart of processing from chart printing to patch measurement in the image forming apparatus.

FIG. 6 is a flowchart illustrating processing performed by the image forming apparatus 100 from when a print instruction of a color patch chart is received till when a colorimetric value of the patch is acquired (colorimetric value acquisition) by the inline sensor 123 and transmitted to the image processing apparatus 101, according to the present embodiment. In the present flowchart, a program stored in the HDD 114 is read out into the RAM 113 and executed by the CPU 111 in the image forming apparatus 100. When a print job transmitted at S703 executed in the image processing apparatus 101 as described below is received by the image forming apparatus 100, the processing described in the present flowchart starts.

At step S (hereinafter, indicated as S) 601, the CPU 111 receives a print job of the color patch chart from the image processing apparatus 101 through the data transmission and reception unit 404.

The CPU 111 analyzes the received print job by the print job analysis unit 402 at S602 and selects a first page of the print job at subsequent S603.

At S604, the CPU 111 executes printing of the selected page by the print processing execution unit 403. The print processing execution unit 403 creates a color patch on and fixes the color patch onto a printing sheet with toner in accordance with page information analyzed in the printing apparatus 122 and outputs the resultant to a sheet discharging destination (not illustrated) connected to the printing apparatus 122.

At S605, the CPU 111 performs color measurement of the color patch fixed onto and printed on the sheet. At this time, the inline sensor control unit 405 measures a spectral value by using the inline sensor 123. Then, the first chromaticity acquisition unit 406 acquires a chromaticity value from the spectral value measured by using the inline sensor 123. The chromaticity value acquired here is, for example, an L*a*b* value.

Here, a method of acquiring L*a*b* by the first chromaticity acquisition unit 406 will be described. The calculation unit 204 of the inline sensor 123 acquires an absolute spectral reflectance ARP ($\lambda$) by using values described below.

Specifically, a detection result P ($\lambda$) of the line sensor 203 that corresponds to reflected light from a measurement image, a detection result W ($\lambda$) of the line sensor 203 that corresponds to reflected light from the white reference plate 240, and an absolute spectral reflectance ARW ($\lambda$) of the white reference plate 240 itself are used. The absolute spectral reflectance ARW ($\lambda$) indicates a reflectance when that of barium sulfate which is a perfectly diffusing sample is 100%. By using the values, the absolute spectral reflectance ARP ($\lambda$) of the measurement image is acquired on the basis of a formula 1.

$$ARP(\lambda)=P(\lambda)/W(\lambda) \times ARW(\lambda) \qquad (1)$$

The calculation unit 204 converts the absolute spectral reflectance ARP (λ) into L*a*b* by a calculation method defined in ISO 13655. In the present embodiment, a color matching function is defined in JIS Z8701 and SD 50 (λ) defined in JIS Z8720 is used as standard light spectral distribution.

XYZ values of the absolute reflectance of each wavelength are acquired by calculation using the color matching function and SD 50 and converted into L*a*b* values.

At subsequent S606, the CPU 111 checks whether or not the page that is currently selected and executed is a last page of the print job, and in a case of the last page (YES at S606), the procedure proceeds to S608. Otherwise (NO at S606), the CPU 111 selects a next page at S607 and the procedure proceeds to S604.

At S608, the CPU 111 transmits, to the image processing apparatus 101, chromaticity values for all color patches of the print job, which are acquired by the first chromaticity acquisition unit 406, and the present flow ends.

[Flowchart Related to Processing Executed in Image Processing Apparatus]

Figure 7:
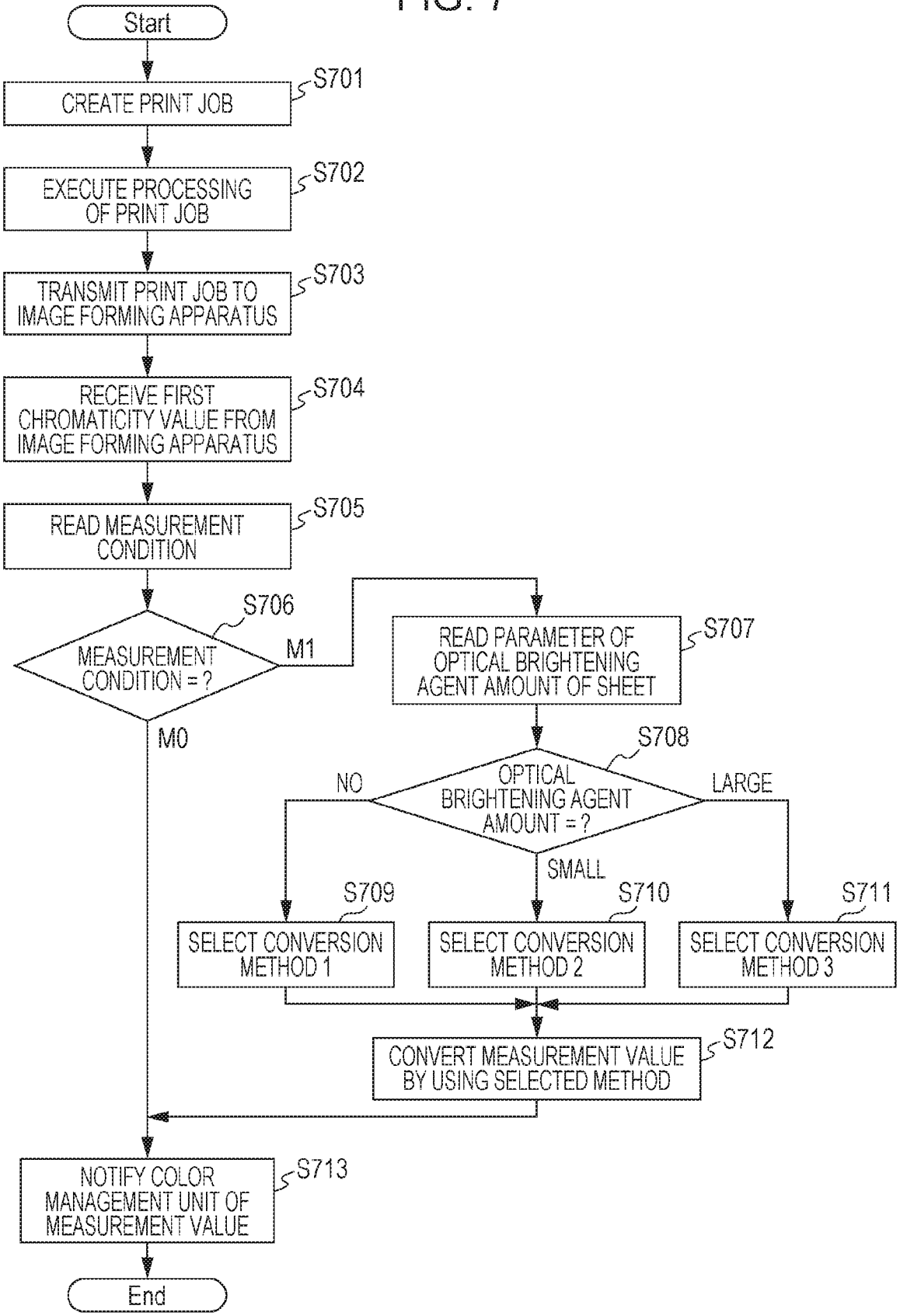
FIG. 7 is a flowchart illustrating an operation of an exemplary embodiment 1.

FIG. 7 is a flowchart illustrating processing performed in the image processing apparatus 101 from when a print instruction of a color patch chart is given till when a measurement value is acquired, according to the present embodiment. The present flowchart is executed by the CPU 141 when a program stored in the HDD 144 is read into the RAM 143 in the image processing apparatus 101. The present flowchart starts when the color management unit 505 instructs to execute printing of the color patch chart.

Figure 8:
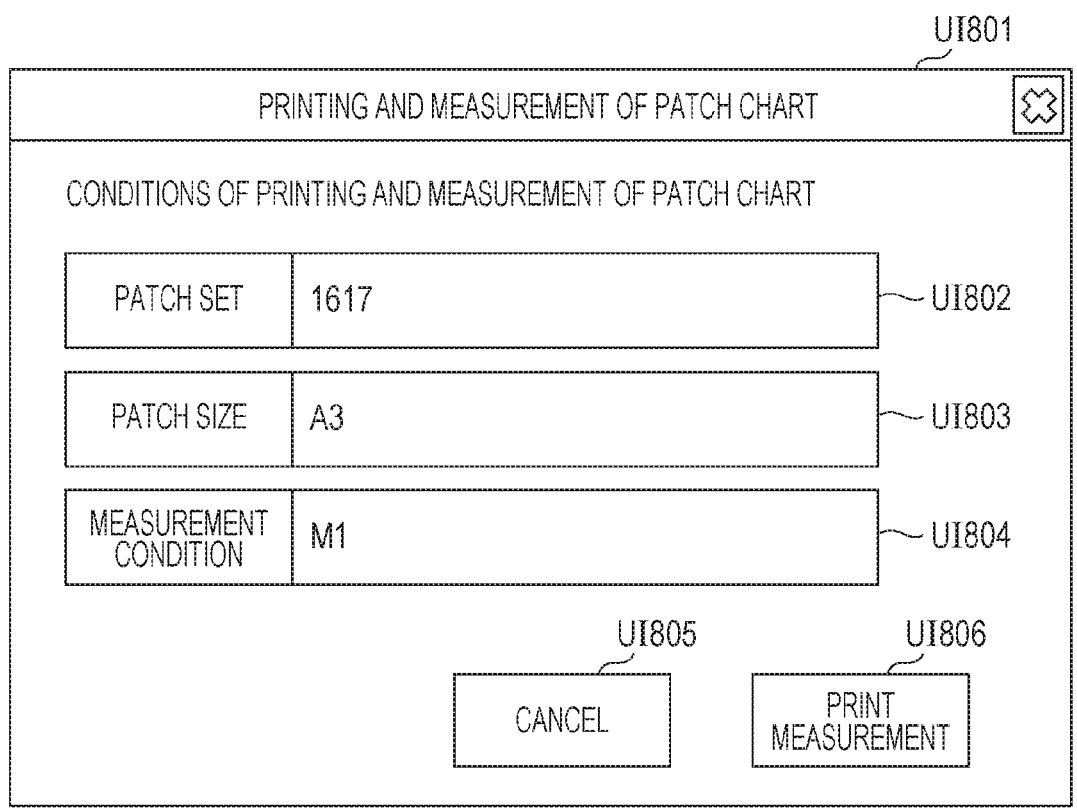
FIG. 8 illustrates an example of a UI screen for performing input of a measurement condition.

FIG. 8 illustrates an example of a UI for receiving conditions of printing and measurement of the color patch chart used in the present embodiment. The UI is displayed on the display unit 153 through the operation unit 151 under control by the UI control unit 501 in the image processing apparatus 101. When the color management unit 505 receives an instruction for execution of any color management processing, for example, through a UI (not illustrated) from a user, the color management unit 505 displays the UI as illustrated in FIG. 8 to receive settings related to the color patch chart. Here, a patch set UI802 for designating the number of patches to be printed, a patch size UI803 for designating a size of a sheet used for printing a chart in which a patch is formed, and a measurement condition UI804 for designating an output condition of a measurement value of the printed chart are designated. A parameter to be designated is not limited thereto and may allow designation from a UI screen UI801 as long as being a parameter needed for printing the color patch chart, for example, such as information of a sheet type. When a cancel button UI805 is pressed, the color management unit 505 ends display in the UI. When a print measurement button UI806 is pressed, the color management unit 505 creates a print job for printing the color patch chart and starts printing and measurement processing of the color patch chart in accordance with a flowchart described below.

At S701, the CPU 141 creates the print job of the color patch chart on the basis of the designated setting. A configuration of the print job created here is decided in accordance with information including the patch set, the patch size, or the like which is input in the UI screen UI801.

At S702, the CPU 141 executes, by the print job processing unit 503, print processing such as rasterizing processing for the print job that is created.

At S703, the CPU 141 transmits print job data, which is subjected to the print processing, to the image forming apparatus 100 through the data transmission and reception unit 504. The CPU 141 may, as desired, transmit patch configuration information (information about the number of patches or arrangement) of the color patch chart, which is to be transmitted as the print job, to the image forming apparatus 100 to be used in the inline sensor control unit 405 of the image forming apparatus 100.

At S704, the CPU 141 receives first chromaticity values for all printed color patches through the data transmission and reception unit 504 from the image forming apparatus 100.

At S705, the CPU 141 reads a measurement condition input in the measurement condition input unit 506. The measurement condition that is read here is a value set in the measurement condition UI804 of FIG. 8 and is a value of the M factor described above. In the present embodiment, M0 or M1 is selected. M0 indicates the measurement condition in which ultraviolet light is not considered. M1 indicates the measurement condition in which ultraviolet light is considered.

At subsequent S706, the CPU 141 determines the measurement condition that is read. When the measurement condition is "M0", the procedure proceeds to S713. Alternatively, when the measurement condition is "M1" at S706, the procedure proceeds to S707.

When the measurement condition is "M1" at S706, the CPU 141 reads, by the second chromaticity conversion unit 507, a parameter of the optical brightening agent amount of a sheet used for printing the color patch chart from the optical brightening agent amount storage unit 510 at subsequent S707. At S708, the CPU 141 determines the optical brightening agent amount of the sheet. In accordance with the read parameter of the optical brightening agent amount, the procedure proceeds to any of S709 to S711 and the CPU 141 selects a conversion method. When the parameter of the optical brightening agent amount indicates "no", the procedure proceeds to S709 and the CPU 141 selects a conversion table which is suitable for the parameter and used to convert the first chromaticity value into the second chromaticity value. When the parameter of the optical brightening agent amount indicates "small", the procedure proceeds to S710 and the CPU 141 selects a conversion table which is suitable for the parameter and used to convert the first chromaticity value into the second chromaticity value. When the parameter of the optical brightening agent amount indicates "large", the procedure proceeds to S711 and the CPU 141 selects a conversion table which is suitable for the parameter and used to convert the first chromaticity value into the second chromaticity value.

At subsequent S712, the CPU 141 uses the conversion table selected at any of S709 to S711 and converts the chromaticity value received at S704 from the first chromaticity value into the second chromaticity value by the second chromaticity conversion unit 507.

Here, the method of converting the first chromaticity value into the second chromaticity value will be described.

When the first chromaticity value and the second chromaticity value according to L*a*b* are respectively (L1*, a1*, b1*) and (L2*, a2*, b2*), the conversion from the first chromaticity value into the second chromaticity value in the present exemplary embodiment is performed by a method of direct mapping using a look-up table. A conversion relation from the first chromaticity value (L1*, a1*, b1*) into the second chromaticity value (L2*, a2*, b2*) is stored as a table in the chromaticity conversion table storage unit 511, and, by using a conversion relation at a closest position as a distance in the L*a*b* space in the table, chromaticity value conversion is performed. The second chromaticity value after the conversion may be calculated by weighted average with use of conversion relations existing at a few places near the position. Here, the look-up table in which the conversion relations are described exists as different tables for each of the conversion methods of S709, S710, and S711.

As indicated in the example of comparison of measurement values described above, a relationship of a chromaticity value varies in accordance with the content of the optical brightening agent and the measurement condition, and thus, when the conversion is performed by using only one conversion table without considering the optical brightening agent amount, a variation is caused in accuracy of the chromaticity value after the conversion. Therefore, the present exemplary embodiment is characterized that the conversion method is changed by using a plurality of conversion tables in consideration of the relationship of the chromaticity value according to the optical brightening agent amount. The conversion table information is decided in advance by the supplier described above and stored in the chromaticity conversion table storage unit 511.

Though description has been given with the method of direct mapping using the look-up table in the present exemplary embodiment, the method for performing the chromaticity value conversion is not limited thereto and another method may be used. As another conversion method, for example, a matrix operation is performed as described below. Here, p1 to p3 are matrix operation coefficients and a part or all of coefficients of the conversion methods of S709, S710, and S711 are different in consideration of influence of the optical brightening agent.

$$(L2* \quad a2* \quad b2*) = \begin{pmatrix} p1 \\ p2 \\ p3 \end{pmatrix} (L1* \quad a1* \quad b1*)$$

In a case of such a method, by storing the respective matrix operation coefficients, instead of the look-up table described above, in a storage unit corresponding to the chromaticity conversion table storage unit 511, chromaticity conversion processing is able to be implemented.

After the conversion into the second chromaticity value at S712 or when the measurement condition is "M0" at S706, the CPU 141 notifies the color management unit 505 of the decided chromaticity value at S713 and the present flow ends.

The color management unit 505 performs desired color management processing by using the second chromaticity value meeting the measurement condition acquired through the flow described above.

According to the image processing apparatus 101 above, even an inline sensor in which a light source is not able to be changed is able to calculate a chromaticity value according to the measurement condition, which is set in accordance with an intended use, while considering an influence of the optical brightening agent amount contained in a sheet. Thereby, color management processing that has fixed accuracy and is stable is able to be implemented without depending on the content of the optical brightening agent.

[Determination of Optical Brightening Agent Amount Using ILS 123]

Next, processing of detecting, by using the ILS 123, the optical brightening agent amount contained in a sheet to be measured and storing a result of the detection in the optical brightening agent amount storage unit 510 described in FIG. 5 will be described with reference to FIGS. 11 and 12.

Figure 11:
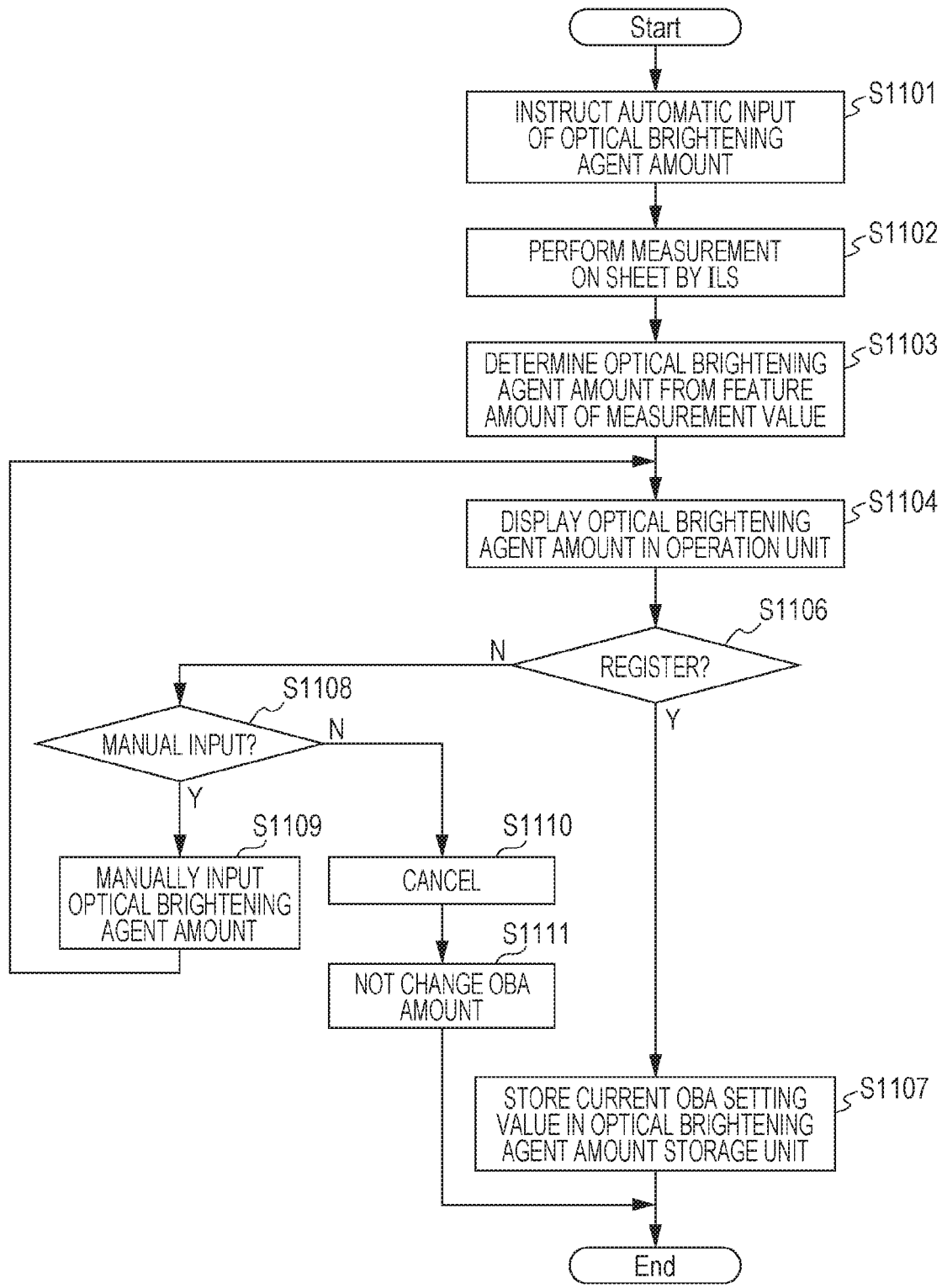
FIG. 11 is a flowchart illustrating an operation of an exemplary embodiment 2.

A program of the image processing apparatus 101, which is related to a flowchart of FIG. 11, is executed by the CPU 141 when the program stored in the HDD 144 is read into the RAM 143. A flow thereof is more specifically such that the color management unit 505 instructs the sheet information management unit 508 to change the optical brightening agent amount, and, in accordance with an instruction from the operation unit 151, the optical brightening agent amount determination unit 512 detects and performs measurement on a blank part of the sheet by using the ILS 123, and then, the optical brightening agent amount is determined from a feature amount acquired by using a result of the measurement.

In the present exemplary embodiment, the image processing apparatus 101 is provided with a sheet information input unit (not illustrated). The sheet information input unit receives sheet information from outside and stores the sheet information in the sheet information DB 509 and the optical brightening agent amount storage unit 510.

FIG. 9 illustrates an example of a UI screen in which sheet information is input, according to the present exemplary embodiment. The UI screen is displayed on the display unit 153 through the operation unit 151 under control of the UI control unit 501 in the image processing apparatus 101.

Figure 12:
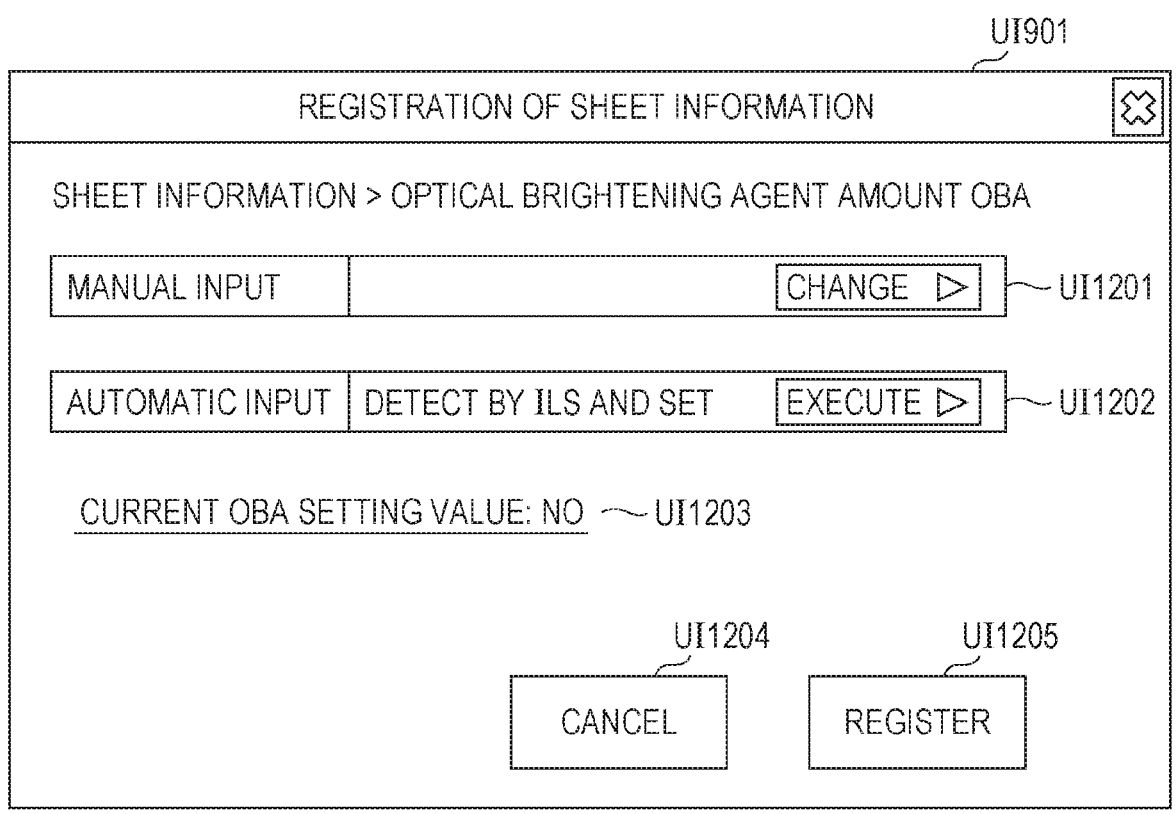
FIG. 12 illustrates a UI screen for performing registration of sheet information.

Upon pressing of a change button UI 906 of the "optical brightening agent amount" in the screen of "registration of sheet information" illustrated in FIG. 9, the CPU 141 shifts the screen displayed in the display unit 153 to a UI screen illustrated in FIG. 12. The screen of FIG. 12 has a configuration in which the optical brightening agent amount in the sheet information is manually input or automatically input to be set and registered.

When an execute button of automatic input is pressed in a UI 1202 (S1101 of FIG. 11), the CPU 141 instructs the inline sensor control unit 405 in the image forming apparatus 100 to measure, with use of the ILS 123, a density of a blank part in a sheet whose content of the OBA is to be determined.

The blank part is a part not subjected to image formation with toner. In accordance with the instruction, the measured density is input to the optical brightening agent amount determination unit 512 (S1102).

The CPU 141 causes the optical brightening agent amount determination unit 512 to determine the optical brightening agent amount from a feature amount obtained from a density measurement result for the blank part acquired by using the ILS 123 (S1103). The CPU 141 displays the optical brightening agent amount in the operation unit as in a UI 1203 of FIG. 12 (S1104). The optical brightening agent amount determination unit 512 receives an instruction through the UI screen and asks the user to select whether to "register (S1106)" a result of the display of the optical brightening agent amount, whether to switch to manual input (S1118), or whether to cancel the change itself (S1110). When the register is selected in a UI 1205, a content displayed in a "current OBA setting value" is stored in the optical brightening agent amount storage unit 510. On the other hand, in the image processing apparatus 101 in which the manual input is selected in S1108, the optical brightening agent amount is manually input and the procedure shifts to S1104 of FIG. 11. When determining that neither the automatic input nor change from the manual input is instructed, the CPU 141 does not change the OBA amount similarly to the case where the cancel button is pressed (S1111) and ends an operation of the automatic input of the optical brightening agent amount in a certain time.

[Determination of Optical Brightening Agent Amount Using Spectral Reflectance]

Next, technical description for determining the optical brightening agent amount from a feature amount of a spectral reflectance measured by using the ILS 123 will be given.

In a case where a measurement object is a sheet, a color measurement device that irradiates the measurement object with light having a wavelength of 400 nm or less like M0 or M1 is affected by the optical brightening agent amount contained in the sheet as illustrated in FIG. 10.

Figure 13:
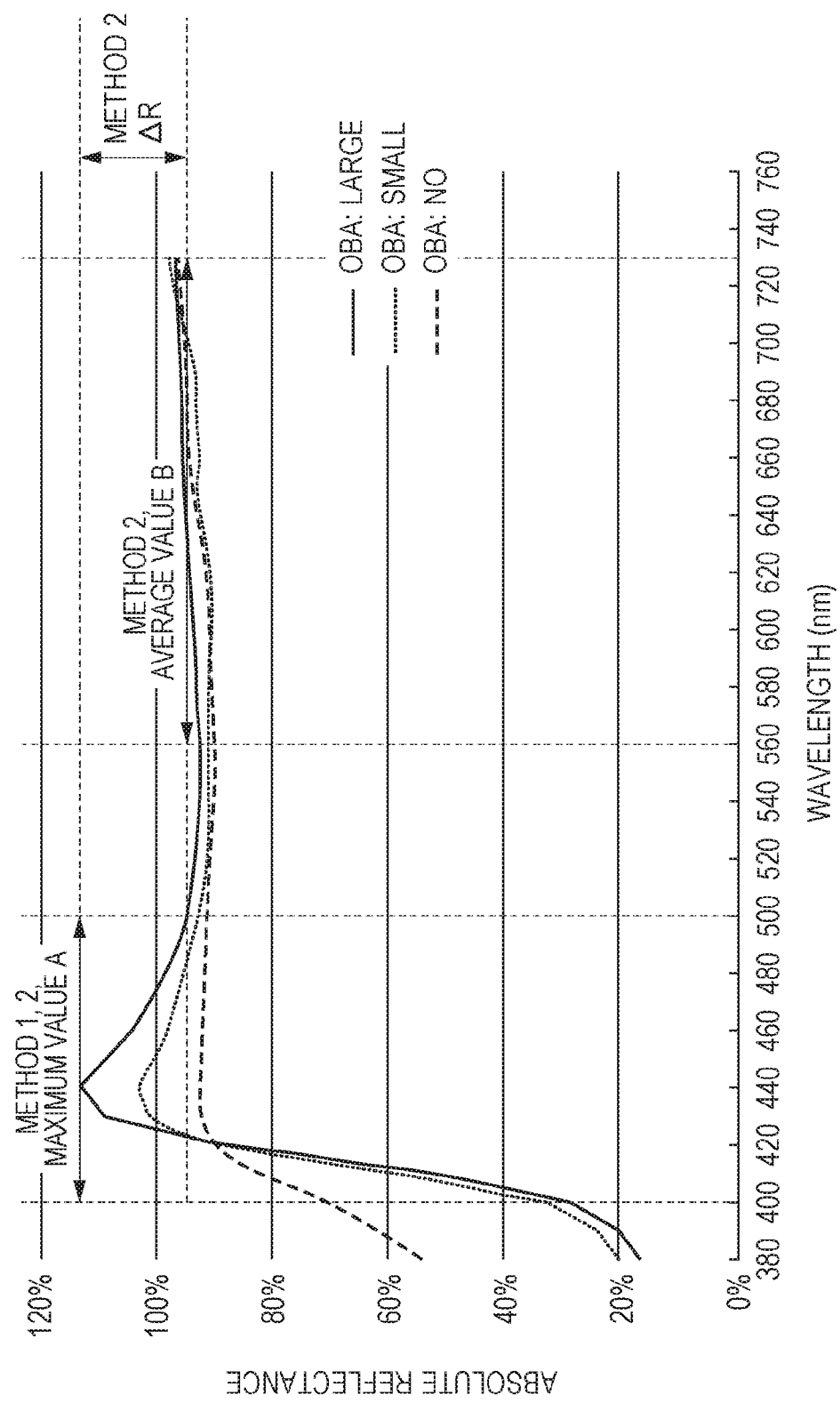
FIG. 13 is a schematic explanatory view of determination of an optical brightening agent amount on the basis of a spectral reflectance.

FIG. 13 illustrates a spectral reflectance obtained as a result of performing measurement on each of sheets that are different in the contained optical brightening agent amount by using the ILS 123. The light source of the ILS 123 is not able to be changed (has fixed characteristics), but has light with the wavelength of 400 nm or less. Thus, when the optical brightening agent amount contained in the sheet to be measured is large, the spectral reflectance to be measured is affected in such a manner that an absolute reflectance near the wavelength of 440 nm exceeds 100% or has an increased difference from another wavelength region. Thus, chromaticity values (L*a*b*) of print patches formed on a sheet whose optical brightening agent amount is large change in a direction b* as illustrated in FIG. 10 under M0 and M1 which are different in a radiation amount of light with the wavelength of 400 nm or less.

By using such characteristics, the optical brightening agent amount contained in the sheet to be measured is able to be determined from the aforementioned feature amount of the spectral reflectance obtained as a result of performing measurement on the sheet with use of the ILS 123.

Then, the present exemplary embodiment adopts a configuration in which the optical brightening agent amount is determined from the aforementioned feature amount of the spectral reflectance by referring to determination conditions in Table 1.

According to the method 1, the determination is simply performed with the maximum reflectance of 400 to 500 nm excited by the optical brightening agent.

The CPU 141 causes the optical brightening agent amount determination unit 512 to refer to the measurement result of the spectral reflectance for a blank part, which is acquired by using the ILS 123. Then, the CPU 141 causes the optical brightening agent amount determination unit 512 to calculate ARPmax (400-500)=A which is the maximum reflectance in the absolute reflectance when light with the wavelength of 400 to 500 nm is radiated, as indicated by A in FIG. 13. When light with the wavelength of 400 nm or less is radiated, the OBA used in a whitish sheet (information sheet) subjected to printing in the image forming apparatus 100 causes reflection light to be excited near 440 nm in many cases. Thus, in a case where the maximum reflectance when light with the wavelength of 400 to 500 nm including 440 nm is radiated is 105% or more, the OBA amount is determined to be large. Similarly, in a case where the maximum reflectance is 95% or more and less than 105%, the OBA amount is determined to be small. Similarly, in a case where the maximum reflectance is less than 95%, it is determined that there is no OBA.

The method 2 has a configuration in which the determination is performed with a reflectance difference from another wavelength range and enables to know the optical brightening agent amount more accurately. Similarly to the method 1, the CPU 141 causes the optical brightening agent amount determination unit 512 to refer to the measurement result of the spectral reflectance for a blank part, which is acquired by using the ILS 123. Then, the CPU 141 causes the optical brightening agent amount determination unit 512 to calculate ARPmax (400-500)=A which is the maximum reflectance in the absolute reflectance when light with the wavelength of 400 to 500 nm is radiated, as indicted by A in FIG. 13. As a method of more accurately discriminating whether an excitation component is derived from the OBA or the reflectance is simply high in a whole wavelength region (whiter sheet that does not use the optical brightening agent), the CPU 141 causes the optical brightening agent amount determination unit 512 to calculate ARPave (560-730)=B which is an average reflectance of light which has the wavelength of 560 to 730 nm and does not include the excitation light derived from the OBA. When the OBA amount is determined in accordance with ΔR which is a difference between A and B, the OBA amount is able to be determined more accurately. When ΔR is 14% or more, the OBA amount is determined to be large. Similarly, when ΔR is 7% or more and less than 14%, the OBA amount is determined to be small. Similarly, when ΔR is less than 7%, it is determined that there is no OBA.

As described in the methods 1 and 2, it is possible to know the OBA amount by analyzing spectral reflectance information of a sheet, which is detected by the ILS 123.

TABLE 1

| | Determination 1 | Determination 2 | Final determination method | OBA: Large | OBA: Small | OBA: No |
|---|---|---|---|---|---|---|
| Method 1 | Maximum reflectance of 400 to 500 nm | — | Determine OBA amount in accordance with maximum absolute reflectance | 105% or more | 95% or more and less than 105% | Less than 95% |
| Method 2 | Maximum reflectance <A> of 400 to 500 nm | Average reflectance <B> of 560 to 730 nm | Determine OBA amount in accordance with reflectance difference ΔR between A and B | ΔR: 14% or more | ΔR: 7% or more and less than 14% | ΔR: less than 7% |

According to the foregoing procedure, it is possible to automatically determine the OBA amount contained in a sheet without determination by a user and implement accurate color management.

Exemplary Embodiment 2

In the exemplary embodiment 1, a method of determining the OBA amount registered in advance in sheet information or the OBA amount of a sheet and registering the resultant in sheet information has been described. In the exemplary embodiment, however, a work is conducted for the purpose of determining the OBA amount separately from a work for color management.

Thus, in the present exemplary embodiment, a configuration in which after the OBA amount is automatically determined at a time of output related to normal color management and color measurement with use of the ILS 123, the procedure is able to proceed to a determination flow at S708 of FIG. 7 will be described.

Figure 14:
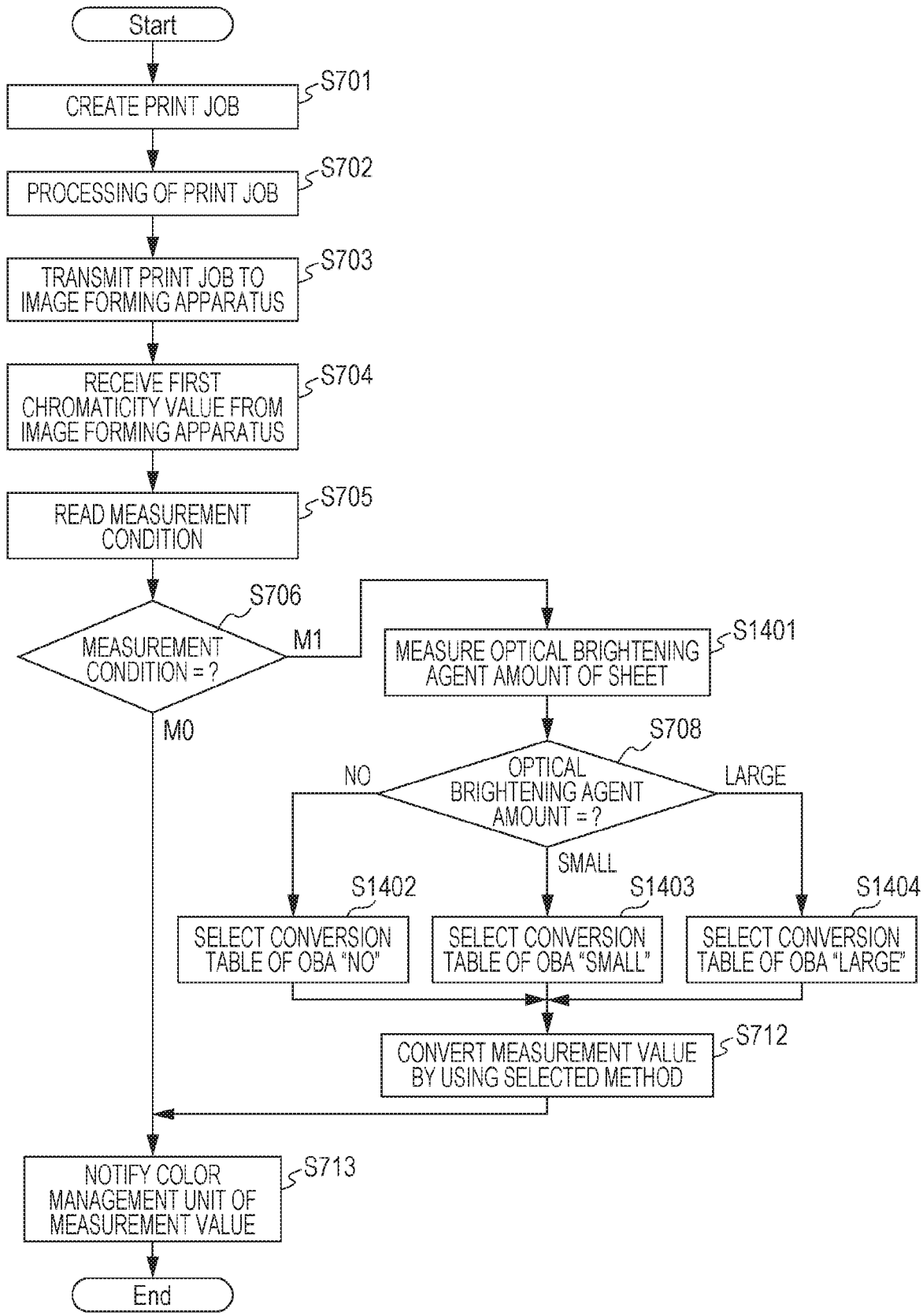
FIG. 14 is a flowchart related to an exemplary embodiment 3.

FIG. 14 is obtained by changing the flow of FIG. 7 used in the exemplary embodiment 1 to a flow of the present exemplary embodiment and is different therefrom in that S707 is replaced with S1401. In S1401, in accordance with the read optical brightening agent amount, the procedure proceeds to any of S1402 to S1404 and the CPU 141 selects a conversion method. When the parameter of the optical brightening agent amount corresponds to "no", the procedure proceeds to S1402 and the CPU 141 selects a conversion table which is suitable for the parameter and used to convert the first chromaticity value into the second chromaticity value. When the parameter of the optical brightening agent amount corresponds to "small", the procedure proceeds to S1403 and the CPU 141 selects a conversion table which is suitable for the parameter and used to convert the first chromaticity value into the second chromaticity value. When the parameter of the optical brightening agent amount corresponds to "large", the procedure proceeds to S1404 and the CPU 141 selects a conversion table which is suitable for the parameter and used to convert the first chromaticity value into the second chromaticity value. In subsequent S712, the CPU 141 uses the conversion table selected at any of S1402 to S1404 and converts the chromaticity value received in S704 from the first chromaticity value into the second chromaticity value by the second chromaticity conversion unit 507.

Figure 15:
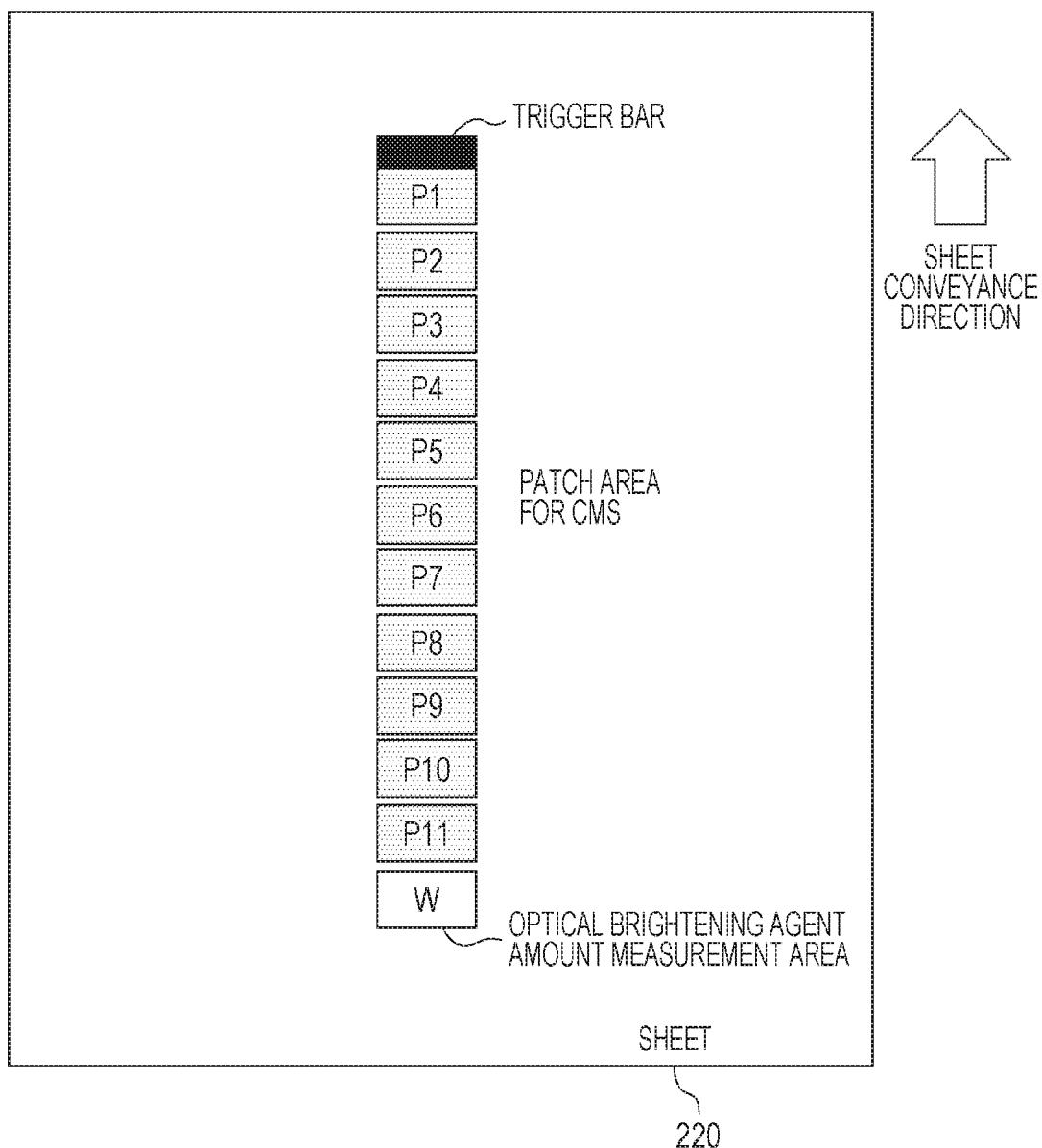
FIG. 15 is a schematic explanatory view of a test chart related to the exemplary embodiment 3.

FIG. 15 is a schematic view of a test chart subjected to color measurement at a time of output related to color management, in which a trigger bar is arranged at a head in a sheet conveyance direction. The ILS 123 starts measurement at a fixed interval after detecting the trigger bar. Patch areas P1 to P11 are used for CMS. The areas are desired to have a configuration which allows the user to arrange a patch in any way and are not suitable for determination of the optical brightening agent amount.

Thus, in the present exemplary embodiment, a region W with a print signal value of 0 is secured on a rear end side of P1 to P11 and a spectral reflectance in the region is measured by the ILS 123 to perform determination described in Table 1.

According to the foregoing configuration, it is possible to provide the image processing apparatus 101 that is able to eliminate time and effort for storing the optical brightening agent amount in registration of sheet information or eliminate printing and color measurement and that has more excellent usability.

Exemplary Embodiment 3

In the exemplary embodiment 1, description has been given on the basis of a configuration of the image processing system in which the first chromaticity value measured in the image forming apparatus 100 is converted into the second chromaticity value in the image processing apparatus 101, but there is no limitation thereto. For example, a configuration in which the second chromaticity conversion processing performed in the image processing apparatus 101 is performed in the image forming apparatus 100 may be provided.

In such a case, without using the image processing apparatus 101, color management unit processing (such as the color check processing, the calibration processing, or the color profile creation processing each of which is described above) may be executed in the image forming apparatus 100. In such a case, the image forming apparatus 100 may also have a configuration similar to that of the color management unit 505 described above.

Moreover, in a case where the color management of the image forming apparatus 100 is performed by using the image processing apparatus 101, the image processing apparatus 101 may receive, from the image forming apparatus 100, the second chromaticity value acquired in the image forming apparatus 100 and use the second chromaticity value in color management processing to be performed by the image processing apparatus 101.

By automatically determining the content of the OBA of a sheet, an appropriate colorimetric value is able to be acquired even when the sheet to be used is a sheet that contains the OBA.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit, or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU)), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-114905 filed Jun. 15, 2018, which is hereby incorporated by reference herein in its entirety.

What is claimed is:

1. An image processing apparatus comprising:
   an operation unit;
   an acquisition unit configured to acquire a chromaticity value, which is a measurement result for a sheet to be measured, by using a sensor in which a light source has fixed characteristics;
   a setting unit configured to set an illuminant condition via the operation unit;
   a determination unit configured to determine an optical brightening agent amount contained in the sheet for enhancing luminance of the sheet by using a spectral reflectance obtained by performing measurement on the sheet with use of the sensor; and
   a chromaticity value conversion unit configured to convert the chromaticity value, which is acquired by the acquisition unit, by using the illuminant condition set by the setting unit and information about the optical brightening agent amount determined by the determination unit.

2. The image processing apparatus according to claim 1, wherein the determination unit determines the optical brightening agent amount contained in the sheet by using a spectral reflectance acquired by performing measurement by the sensor for a blank part in the sheet, in which an image is not formed.

3. The image processing apparatus according to claim 1, wherein the sensor is a spectral color measurement device in which a wavelength of the light source has a fixed length.

4. The image processing apparatus according to claim 1, wherein the illuminant condition is a condition about characteristics of illumination used for the sensor to perform color measurement of the sheet.

5. The image processing apparatus according to claim 1, wherein when the condition designated by the designation unit varies, a conversion table of the acquired chromaticity value, which is used by the chromaticity value conversion unit, varies.

6. The image processing apparatus according to claim 1, further comprising
   a management unit configured to be connected to an image forming apparatus including an image forming unit, and to manage a color of an image, which is formed by the image forming unit, by using the chromaticity value converted by the chromaticity value conversion unit.

7. The image processing apparatus according to claim 1, further comprising
   a registration unit configured to register information of the sheet, wherein
   the registration unit for the sheet registers the information about the optical brightening agent amount contained in the sheet.

8. The image processing apparatus according to claim 1, wherein the illuminant condition includes at least either of an illuminant condition including ultraviolet light and an illuminant condition not including ultraviolet light.

9. The image processing apparatus according to claim 1, wherein the chromaticity value conversion unit converts the chromaticity value acquired by the acquisition unit by using a conversion table selected based on the optical brightening agent amount determined by the determination unit.

10. An image processing method comprising:
    acquiring a chromaticity value, which is a measurement result for a sheet to be measured, by using a sensor in which a light source has fixed characteristics;
    setting an illuminant condition via an operation unit;
    determining an optical brightening agent amount contained in the sheet for enhancing luminance of the sheet by using a spectral reflectance obtained by performing measurement on the sheet with use of the sensor; and
    converting the chromaticity value, which is acquired in the acquiring, by using the set illuminant condition and information about the optical brightening agent amount determined in the determining.

11. A non-transitory storage medium storing instructions that, when executed by a computer, cause the computer to perform an image processing method comprising:
    acquiring a chromaticity value, which is a measurement result for a sheet to be measured, by using a sensor in which a light source has fixed characteristics;
    setting an illuminant condition via an operation unit;
    determining an optical brightening agent amount contained in the sheet for enhancing luminance of the sheet by using a spectral reflectance obtained by performing measurement on the sheet with use of the sensor; and
    converting the chromaticity value, which is acquired, by using the set illuminant condition and information about the determined optical brightening agent amount.

* * * * *